United States Patent [19]

Gölzer et al.

[11] Patent Number: 5,339,782

[45] Date of Patent: Aug. 23, 1994

[54] ARRANGEMENT FOR CONTROLLING THE DRIVE POWER OF A MOTOR VEHICLE

[75] Inventors: Thomas Gölzer, Schwieberdingen; Martin Streib, Vaihingen/Enz, both of Fed. Rep. of Germany

[73] Assignee: Robert Bosch GmbH, Stuttgart

[21] Appl. No.: 958,309

[22] Filed: Oct. 8, 1992

[30] Foreign Application Priority Data

Oct. 8, 1991 [DE] Fed. Rep. of Germany ....... 4133268

[51] Int. Cl.$^5$ ..................... F02D 11/10; F02D 41/04; F02D 41/22; F02P 5/15

[52] U.S. Cl. .................................... 123/399; 123/417; 123/480

[58] Field of Search ............... 123/417, 478, 480, 361, 123/399; 364/431.05, 431.06, 431.07, 431.08

[56] References Cited

U.S. PATENT DOCUMENTS

| | | | |
|---|---|---|---|
| 4,603,675 | 8/1986 | Junginger et al. | 123/478 |
| 4,762,105 | 8/1988 | Beyer et al. | 123/417 |
| 4,894,781 | 1/1990 | Sato et al. | 123/417 X |
| 4,920,939 | 5/1990 | Gale | 123/399 |
| 4,972,816 | 11/1990 | Mausner | 123/399 |
| 5,001,642 | 3/1991 | Botzenhardt et al. | 123/417 X |
| 5,095,874 | 3/1992 | Schnaibel et al. | 123/399 X |
| 5,235,951 | 8/1993 | Taguchi et al. | 123/399 X |

FOREIGN PATENT DOCUMENTS

| | | |
|---|---|---|
| 3539407 | 5/1987 | Fed. Rep. of Germany . |
| 3821286 | 12/1989 | Fed. Rep. of Germany . |
| 4004086 | 8/1991 | Fed. Rep. of Germany . |
| 2173611 | 10/1986 | United Kingdom . |
| 2191875 | 12/1987 | United Kingdom . |

*Primary Examiner*—Willis R. Wolfe
*Attorney, Agent, or Firm*—Walter Ottesen

[57] ABSTRACT

An arrangement for controlling the drive power of a motor vehicle has at least two control units for controlling at least two changing variables for influencing the drive power. The variables are independent of each other. The arrangement further includes at least one measuring device for detecting an operating variable of the drive unit and/or of the motor vehicle. This one measuring unit includes at least two redundant sensors with the output signal of one sensor being supplied to a first control unit and the output signal of another sensor being supplied to a second control unit. Both control units monitor the measuring device on the basis of the output signals with additional monitoring measures being carried out on the basis of the monitoring results of the two control units.

11 Claims, 2 Drawing Sheets

ARRANGEMENT FOR CONTROLLING THE DRIVE POWER OF A MOTOR VEHICLE

BACKGROUND OF THE INVENTION

Electronic systems in motor vehicles which are critical to safety are now more and more being equipped with redundant components such as sensors and or computer elements. This increases the operational reliability and availability of the motor vehicle.

Accordingly, a control system for a motor vehicle with two processors is disclosed in published German patent application 3,539,407. Furthermore, measuring devices such as the position transducer of an operator-controlled element or the engine speed transducer are arranged as being redundant in this known system. The signals of the redundantly configured measuring devices are supplied to the two processors, respectively, which carry out the control of the drive power of the motor vehicle on the basis of computer programs which are virtually identical. The output signals of both processors act on the same changeable power-influencing variable of the drive unit of the motor vehicle.

The complete redundancy of such a system contributes however to a considerable increase in complexity and therefore increased costs and also increased occurrences of malfunctions.

SUMMARY OF THE INVENTION

It is an object of the invention to provide an arrangement for controlling the drive power of a motor vehicle wherein components critical to safety are redundantly configured without leading to more complexity and increased costs.

This is obtained in that for a measuring device comprising at least two redundant sensors, the output signal of one sensor is supplied to a first control unit which controls at least one first changing variable of the drive unit; whereas, the output signal of the other sensor of the measuring device is supplied to a second control unit controlling at least one further changeable variable of the drive unit.

It is known that modern motor vehicles are in part equipped with a plurality of electronic control units. Especially to be mentioned are: a control unit for fuel injection, a control unit for ignition, an electronic engine-power control, an electronic transmission-control unit, an ABS-control unit, an ASR-control unit as well as a road-speed controller. These control units operate on other changeable variables of a drive unit of a motor vehicle.

In modern motor vehicles, these control units are interconnected by an electronic line system (CAN-bus) and exchange data and information with each other over this line system.

U.S. Pat. No. 4,603,675 discloses that a fault condition in the region of the accelerator pedal, the measuring devices or the supply lines can be detected by means of a plausibility check of the signal values of the two redundant position transducers. It is also known to derive a fault condition of the electronic engine-control system from a plausibility comparison between accelerator-pedal position and throttle-flap position.

U.S. Pat. No. 4,972,816 discloses measures for determining shunt resistances and transfer resistances for potentiometers.

The procedure provided by the invention affords the advantage that already available elements can be used or evaluating and fault monitoring measuring devices configured for redundancy. In this way, the additional complexity which as a rule is necessary and the additional costs resulting therefrom can be avoided in connection with redundant systems or subsystems.

It is further advantageous that fault monitoring is further refined by means of the procedure provided by the invention whereby operational reliability and availability of the motor vehicle is increased.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
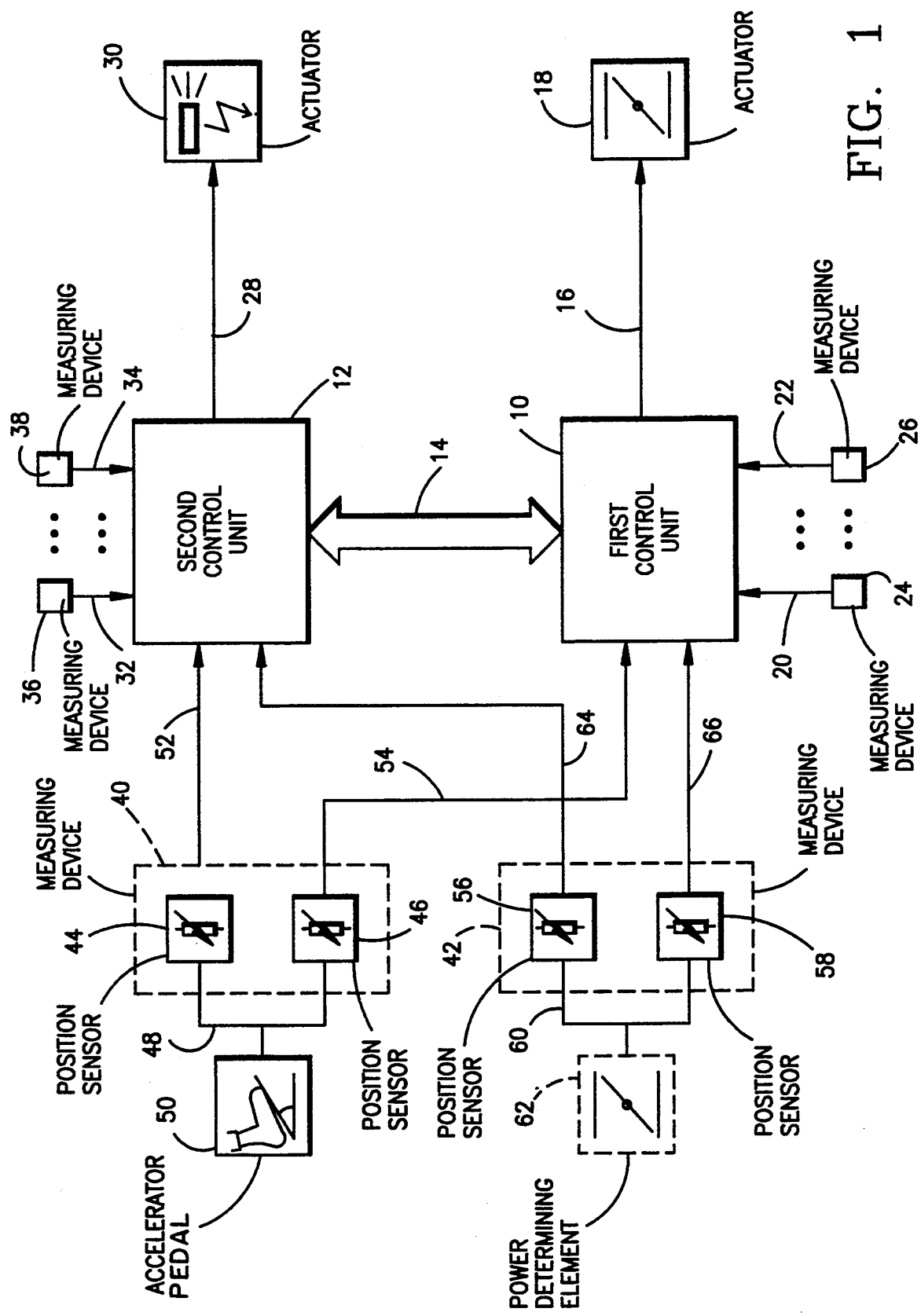
FIG. 1 is a block diagram of an arrangement according to the invention for controlling the drive power of a motor vehicle; and, FIG. 2 is a flowchart for a program for monitoring this system with the program being run through in one of the control units.

FIG. 1 shows an arrangement for controlling the drive power of a motor vehicle with respect to an example of a control system for a motor vehicle equipped with an internal combustion engine. A first control unit 10 is provided which controls a first changeable variable for influencing the drive power of the motor vehicle.

A second control unit 12 is provided which controls at least a second changeable variable for influencing the drive power of the motor vehicle.

In the embodiment shown, the control unit 10 is an electronic engine-power control system for the open-loop control of a throttle flap; whereas, the control unit 12 is a control unit for fuel metering and is possibly supplemented with an ignition control.

In other embodiments, the control unit 10 can be a control unit for at least influencing the metering of fuel; whereas, the control unit 12 can be an electronic-transmission control unit or an ABS/ASR-control unit.

The control units 10 and 12 are connected via a bus system 14 for communication purposes. The control unit 10 includes an output line 16 which connects the control unit 10 to an actuating device 18 for controlling a power-determining element such as a throttle flap or an injection pump of an engine (not shown). The control unit 10 is supplied with operating variables of the engine and/or of the motor vehicle via input lines 20 to 22 and which are detected by measuring devices 24 to 26, respectively. In the same manner, the control unit 12 includes an output line 28 which connects this control unit to an actuator device 30 for adjusting the fuel metering and/or the ignition. Input lines 32 to 34 supply to the control unit 12 operating variables of the engine and/or of the motor vehicle which are detected by measuring devices 36 to 38, respectively.

In addition, the arrangement shown in FIG. 1 includes at least one of the measuring devices 40 or 42. These measuring devices are configured at least partially of redundant sensors in pregiven operating areas. In one advantageous embodiment, a position transducer is disclosed connected to an operator-controlled element 50 and/or to a power-determining element 62. The power-determining elements 18 and 62 can be identical.

The measuring device 40 includes the position sensors 44 and 46 which can be configured as follows: potentiometers, contactless position transducers and/or switching functions. The measuring device 40 is connected to an operator-controlled element 50 via a mechanical connection 48. The operator-controlled element 50 can especially be an accelerator pedal. The output signal line 52 of the sensor 44 is connected to the second control unit 12; whereas, the output line 54 of sensor 46 is connected to the first control unit 10.

In a similar manner, the measuring device 42 includes the sensors 56 and 58. The measuring device 42 is connected via a mechanical connection 60 to a power-determining element 62 which can be a throttle flap or an injection pump. The output line 64 of the sensor 56 connects the measuring device 42 to the second control unit 12; whereas, the output line 66 of the sensor 58 connects the measuring device 42 to the first measuring unit 10.

In other advantageous embodiments, the sensors can also be pressure sensors, engine-speed sensors, wheel-speed sensors, temperature sensors, load sensors and the like.

The procedure provided by the invention is especially suitable also for applications in combination with alternative drive systems such as electric drives and the like.

The operation of the arrangement described herein will now be explained with reference to an electronic engine-power control system and a fuel injection system.

The first control unit 10 is the electronic engine-power control system and forms a desired value for the position of the power-determining element 18 on the basis of the position of the operator-controlled element supplied via line 54 and, if required, the operating variables supplied via lines 20 to 22 such as road speed, wheel speed, transmission position, engine speed and the like. The actual value of the position of the power-determining actuator element 62 is supplied via line 66. The desired value is compared to this actual value and a drive signal is generated for adjusting the actuator element 18 with the drive signal being generated by a controller equation. This drive signal is transmitted via the line 16 to the actuator element 18 which adjusts the power-determining element 62 in the sense of a closed-loop control of the actual value to the desired value.

In a like manner, the control unit 12 forms an output signal for controlling the fuel quantity to be metered on the basis of operating variables supplied thereto via lines 32 to 34 such as engine temperature, load, engine speed, road speed, battery voltage and the like and, if necessary, the positions of operator-controlled element 50 and the power-determining element 62 supplied via lines 52 and 64, respectively. This output signal is transmitted via the line 28 to the actuator element 30.

The above-mentioned operating variables are partially identical. Only one measuring device is needed for detecting operating variables of this kind. The measured values are exchanged between the control units 10 and 12 via the bus system 14. The same applies to the position values detected by the sensors 44 and 56 and/or 46 and 58.

For monitoring purposes, the measured values detected by the sensors 44 and 46 as well as sensors 56 and 58 are compared in both control units (10, 12) to each other with respect to a pregiven tolerance range. If, for example, a fault condition is detected on the basis of the plausibility checks, in the region of the measuring device 40, which detects the position of the operator-controlled element 50, then the defective sensor is determined by means of a check of the signal trace or a check of the transfer resistances in the case of potentiometers. In this connection, a sensor is especially then defective when the change of its signal value takes place extremely rapidly, that is in a way, which is normally not possible. In this case, only the sensor which is still operational is used for forming the desired value. This ensures that during a passing operation of the vehicle on the highway, the power does not suddenly drop. After a certain time, by limiting the power such as by limiting the opening of the throttle flap or by limiting the maximum quantity of fuel injected, an emergency operation can be initiated. If no defective sensor is determined, then a power limitation is carried out immediately.

If a fault in the area of the measuring device 42 is detected, then the throttle flap is actively driven closed and opened for a very short time in the context of a pregiven check movement. During this time, the injection is suppressed by means of the control unit 12 as a consequence of a corresponding signal from the control unit 10 to the control unit 12 via the bus system 14 so that no dangerous acceleration situation can occur. If the sensor signal does not follow the throttle flap, then the sensor connected thereto is recognized as being defective. Here too, the operational sensor is then utilized for computing the output signal of the control unit 10.

If the defective state of a sensor occurs because of contamination, it is possible to remove the defect condition by the test movement of the throttle flap. The procedure of the invention then makes possible a continued normal use of the motor vehicle.

If only one control unit repeatedly detects a defect condition, then a system fault is assumed and the emergency condition is initiated by a power limitation.

The possibility of conducting a plausibility comparison between an accelerator pedal position and the position of the power-determining element is also possible. If a defect condition of this kind is detected by both control units, then a power limitation is likewise initiated.

Figure 2:
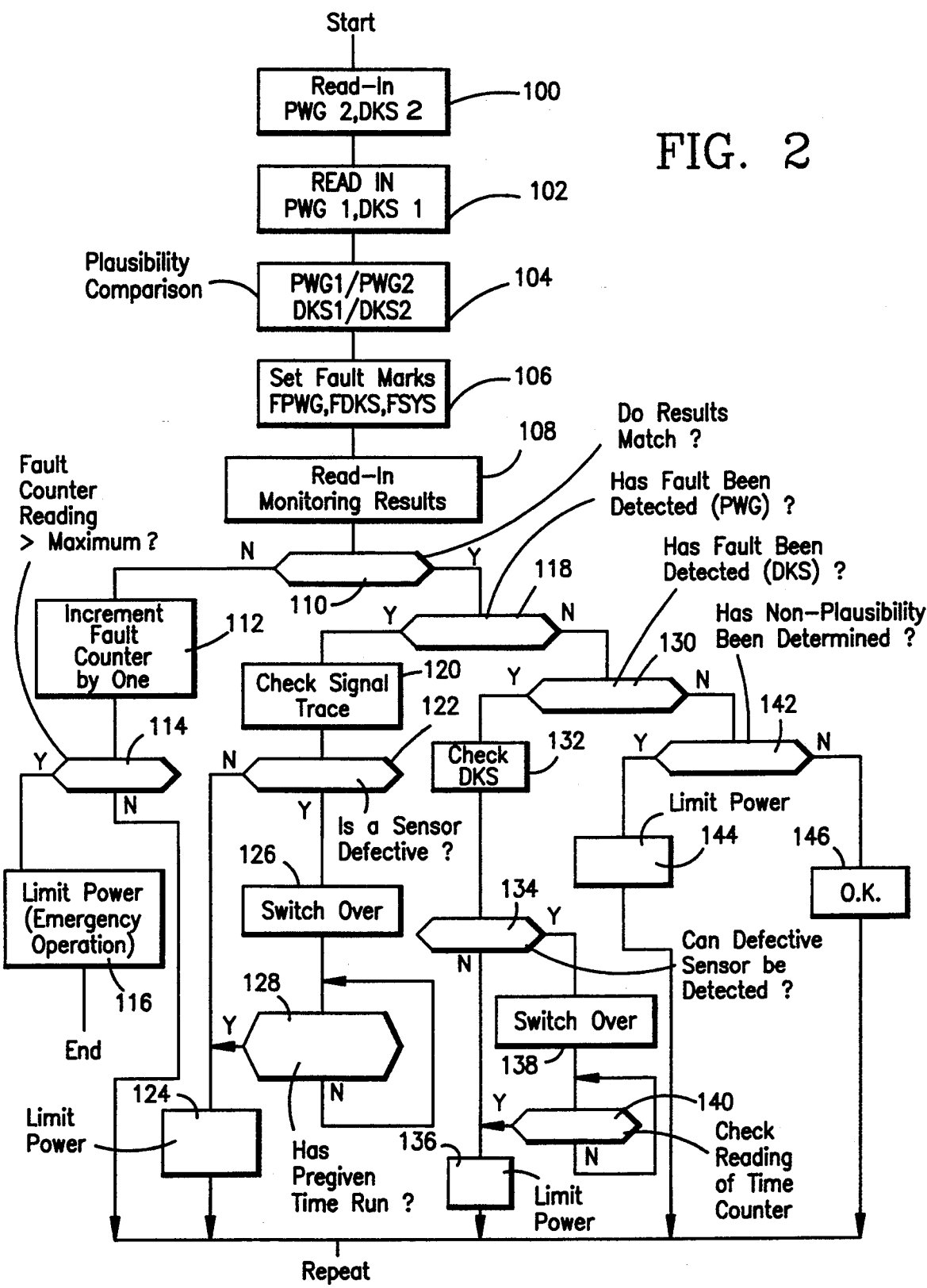

FIG. 2 shows the procedure provided by the invention in the context of a flowchart of a program which is run through in control unit 10. A comparable program is run through in the control unit 12.

At the beginning of the subprogram, the respective measured values of sensors 46 (PWG2) and 58 (DKS2) are read in in step 100. Thereafter, in step 102, the measured values of the sensors 44 (PWG1) and 56 (DKS1) are read in via the bus system 14 with these measured values having been detected by the control unit 12. Thereafter, in step 104, the plausibility comparisons take place with respect to pregiven tolerance ranges between the measured values of sensors 44 (PWG1) and 46 (PWG2), 56 (DKS1) and 58 (DKS2) as well as 46 (PWG2) and 58 (DKS2) and 44 (PWG1) and 56 (DKS1). In step 106, if a non-plausibility is detected between the measured values of sensors 44 and 46, then a fault mark FPWG is set and for a non-plausibility of measured values of sensors 56 and 58, a fault mark FDKS is set as well as the fault mark FSYS in the case of non-plausibility of measured values of sensors 46 and 58. Thereafter, in step 108, the corresponding monitoring results of the control units 12 or 10 are read in.

In the subsequent inquiry step 110, a check is made by means of a comparison of the fault marks as to whether the results of the two control units correspond to each other. If this is not the case, then in step 112, a fault counter is incremented by 1 with the count thereof being interrogated in step 114. If the fault counter exceeds a maximum value, then a power limitation (emergency operation) is carried out in accordance with step 116 and the subprogram is ended. In the opposite case, the subprogram is repeated at a pregiven time.

The fault counter ensures in an advantageous manner that the power reduction is introduced only for a continuing fault condition.

If the monitoring results match in step 110 then, in step 118, the fault counter is set to zero and the fault mark FPWG is checked. This fault mark FPWG represents a fault in the area of the operator-controlled element, the measuring device 40 or the supply line. If a fault is detected, then a check of the signal trace follows in step 120 or, in the case of potentiometers, the check of the contact resistance between slider and slider track. The check of the potentiometer takes place in accordance with the state of the art noted in the above-mentioned U.S. Pat. No. 4,972,816; whereas, the check of the signal trace takes place by means of a comparison of the measured value detected in the present program pass-through (for example PWG1) with a measured value (PWG1(t)) detected in the previous program pass-through while considering the time T which has passed in the meantime (PWG1−PWG1(t)/T>threshold).

In inquiry step 122, a determination is made as to whether the check according to step 120 indicated a defective sensor. If this is not the case, then in step 124 an emergency procedure is initiated and the subprogram is repeated at a pregiven time.

In the opposite case, the control functions of the control units are carried out on the basis of the non-defective sensor in accordance with step 126.

A counter is provided in one embodiment. After a pregiven time has run (step 128) after the detection of a fault, then in this embodiment, a power limitation is initiated in accordance with step 124. This counter precludes a dangerous interruption of the passing operation.

If it is determined in inquiry step 118 that no fault is present in the area of the measuring device 40, then in step 130 a check is made as to whether a fault has been detected in the area of measuring device 42. If this is the case, then in step 132, the fuel metering is switched off and the power-determining actuator element 62 is subjected to a check movement. In an advantageous embodiment, the control unit 10 is configured in such a manner that this check movement includes driving the power-determining element 62 to both end positions. In other embodiments, a specific movement sequence can be provided, for example, a vibrating movement with pregiven amplitude or driving the element 18 once up and down. The check movement takes place via drive signals generated by the control unit 10 according to a pregiven time plan and supplied via the line 16.

In inquiry step 134, the defective sensor is isolated on the basis of the signal traces of the measuring signals when the measuring signals do not follow the trace of the drive signal. If no defective sensor can be detected on the basis of the signal trace, then a limitation of power is initiated in accordance with step 136. In the opposite case, and in the same manner of step 126, the system function is carried out in step 138 in dependence upon the non-defective sensor. In step 140, the count of the time counter which runs therewith is checked so that, after a pregiven time has run, a power limitation in accordance with step 136 is initiated; whereas, when the time has not run, the control functions continue to be carried out in dependence upon the non-defective sensor.

If no fault in the area of the measuring device 42 is detected in step 130, then and in accordance with step 142, a check is made to whether a non-plausibility has been determined between the accelerator-pedal position and the position of the power-determining element 62. If this is the case, then and in accordance with step 144, a power limitation (emergency operation) is initiated and the subprogram is repeated. If no non-plausibility is determined, then and in accordance with step 146, the system is in a fault-free condition. Thereafter, the subprogram is repeated.

The procedure described above is advantageous in both control units. In this way, a redundancy of the system is provided without increasing the complexity in one control unit. When a fault is detected, each control unit intervenes by operating on the changing variable assigned thereto for limiting or reducing power.

The procedure described above is carried out in only one control unit in still another embodiment of the invention.

It is understood that the foregoing description is that of the preferred embodiments of the invention and that various changes and modifications may be made thereto without departing from the spirit and scope of the invention as defined in the appended claims.

What is claimed is:

1. An arrangement for controlling the drive power of a motor vehicle, the arrangement comprising:
  a drive unit for driving the motor vehicle and having at least first and second variables related to the power output developed by said drive unit;
  a first control unit for controlling at least said first variable;
  a second control unit for controlling at least said second variable;
  a measuring device having at least first and second sensors for detecting an operating parameter of at least one of the said drive unit and said motor vehicle;
  said first and second sensors being mutually redundant and having first and second output signals, respectively;
  said first control unit being connected to one of said sensors for receiving the output signal thereof;
  said second control unit being connected to the other one of said sensors for receiving the output signal thereof;
  a bus system interconnecting said first and second control units to facilitate the exchange of data therebetween;
  each of said control units including means for processing the output signal supplied thereto to provide a processing result which is transmitted over said bus system to the other control unit; and
  each one of said control units including means for utilizing the processing result received from the other control unit when controlling the one of said first and second variables corresponding to said one control unit.

2. The arrangement of claim 1, said drive unit being an internal combustion engine having a throttle flap; said first control unit being an electronic engine power control unit for adjusting said throttle flap; and, said second control unit being an electronic control unit for controlling at least one of the quantity of fuel metered to the engine and the ignition.

3. The arrangement of claim 2, said two sensors of said measuring device being two position transducers operatively connected to an operator-controlled element.

4. The arrangement of claim 2, said two sensors of said measuring device being two position transducers operatively connected to said throttle flap.

5. An arrangement for controlling the drive power of a motor vehicle, the arrangement comprising:
- a drive unit for driving the motor vehicle and having at least first and second variables related to the power output developed by said drive unit;
- a first control unit for controlling at least said first variable;
- a second control unit for controlling at least said second variable;
- a measuring device having at least first and second sensors for detecting an operating parameter of at least one of the said drive unit and said motor vehicle;
- said first and second sensors being mutually redundant and having first and second output signals, respectively;
- said first control unit being connected to one of said sensors for receiving the output signal thereof;
- said second control unit being connected to the other one of said sensors for receiving the output signal thereof; and,
- each of said control units being adapted to check the output signals applied thereto with respect to plausibility.

6. The arrangement of claim 5, wherein at least one of said control units is adapted to compare the results of the plausibility checks in both of said control units.

7. An arrangement for controlling the drive power of a motor vehicle, the arrangement comprising:
- a drive unit for driving the motor vehicle and having at least first and second variables related to the power output developed by said drive unit;
- a first control unit for controlling at least said first variable;
- a second control unit for controlling at least said second variable;
- a measuring device having at least first and second sensors for detecting an operating parameter of at least one of the said drive unit and said motor vehicle;
- said first and second sensors being mutually redundant and having first and second output signals, respectively;
- said first control unit being connected to one of said sensors for receiving the output signal thereof;
- said second control unit being connected to the other one of said sensors for receiving the output signal thereof;
- said drive unit being an internal combustion engine having a throttle flap;
- said first control unit being an electronic engine power control unit for adjusting said throttle flap;
- said second control unit being an electronic control unit for controlling at least one of the quantity of fuel metered to the engine and the ignition; and,
- wherein a reduction in power occurs in response to a detected deviation after a predetermined time.

8. An arrangement for controlling the drive power of a motor vehicle, the arrangement comprising:
- a drive unit for driving the motor vehicle and having at least first and second variables related to the power output developed by said drive unit;
- a first control unit for controlling at least said first variable;
- a second control unit for controlling at least said second variable;
- a measuring device having at least first and second sensors for detecting an operating parameter of at least one of the said drive unit and said motor vehicle;
- said first and second sensors being mutually redundant and having first and second output signals, respectively;
- said first control unit being connected to one of said sensors for receiving the output signal thereof; and,
- said second control unit being connected to the other one of said sensors for receiving the output signal thereof;
- said drive unit being an internal combustion engine having a throttle flap;
- said first control unit being an electronic engine power control unit for adjusting said throttle flap;
- said second control unit being an electronic control unit for controlling at least one of the quantity of fuel metered to the engine and the ignition; and,
- wherein the defective sensor is detected from measurements and/or plausibility checks of the signal trace when the comparison results are the same when a defect is detected in the measuring device.

9. An arrangement for controlling the drive power of a motor vehicle, the arrangement comprising:
- a drive unit for driving the motor vehicle and having at least first and second variables related to the power output developed by said drive unit;
- a first control unit for controlling at least said first variable;
- a second control unit for controlling at least said second variable;
- a measuring device having at least first and second sensors for detecting an operating parameter of at least one of the said drive unit and said motor vehicle;
- said first and second sensors being mutually redundant and having first and second output signals, respectively;
- said first control unit being connected to one of said sensors for receiving the output signal thereof;
- said second control unit being connected to the other one of said sensors for receiving the output signal thereof;
- said drive unit being an internal combustion engine having a throttle flap;
- said first control unit being an electronic engine power control unit for adjusting said throttle flap;
- said second control unit being an electronic control unit for controlling at least one of the quantity of fuel metered to the engine and the ignition; and,
- wherein the control function is carried out on the basis of the non-defective sensor when the defective sensor has been detected.

10. An arrangement for controlling the drive power of a motor vehicle, the arrangement comprising:
- a drive unit for driving the motor vehicle and having at least first and second variables related to the power output developed by said drive unit;
- a first control unit for controlling at least said first variable;
- a second control unit for controlling at least said second variable;
- a measuring device having at least first and second sensors for detecting an operating parameter of at least one of the said drive unit and said motor vehicle;
- said first and second sensors being mutually redundant and having first and second output signals, respectively;
- said first control unit being connected to one of said sensors for receiving the output signal thereof;
- said second control unit being connected to the other one of said sensors for receiving the output signal thereof;
- said drive unit being an internal combustion engine having a throttle flap;
- said first control unit being an electronic engine power control unit for adjusting said throttle flap;
- said second control unit being an electronic control unit for controlling at least one of the quantity of fuel metered to the engine and the ignition; and,
- wherein a reduction in power occurs when a defective sensor has been determined or after a pregiven time after a switchover has taken place to the non-defective sensor.

11. An arrangement for controlling the drive power of a motor vehicle, the arrangement comprising:
- a drive unit for driving the motor vehicle and having at least first and second variables related to the power output developed by said drive unit;
- a first control unit for controlling at least said first variable;
- a second control unit for controlling at least said second variable;
- a measuring device having at least first and second sensors for detecting an operating parameter of at least one of the said drive unit and said motor vehicle;
- said first and second sensors being mutually redundant and having first and second output signals, respectively;
- said first control unit being connected to one of said sensors for receiving the output signal thereof;
- said second control unit being connected to the other one of said sensors for receiving the output signal thereof;
- said drive unit being an internal combustion engine having a throttle flap;
- said first control unit being an electronic engine power control unit for adjusting said throttle flap;
- said second control unit being an electronic control unit for controlling at least one of the quantity of fuel metered to the engine and the ignition; and,
- wherein a fault evaluation takes place only in one of said control units.

* * * * *